(12) United States Patent  (10) Patent No.: US 12,367,053 B2
Chang et al.  (45) Date of Patent: Jul. 22, 2025

(54) INTERFACE DISPLAY METHOD FOR DISPLAYING INTERFACE IDENTIFIERS IN AN INTERFACE

(71) Applicant: Beijing Zitiao Network Technology Co., Ltd., Beijing (CN)

(72) Inventors: Weiyi Chang, Beijing (CN); Yuze Sun, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/806,583

(22) Filed: Aug. 15, 2024

(65) Prior Publication Data
US 2024/0411570 A1   Dec. 12, 2024

Related U.S. Application Data

(63) Continuation of application No. PCT/CN2023/075130, filed on Feb. 9, 2023.

(30) Foreign Application Priority Data
Feb. 15, 2022  (CN) .......................... 202210137766.9

(51) Int. Cl.
G06F 9/451 (2018.01)
G06F 3/0483 (2013.01)
G06F 3/0485 (2022.01)

(52) U.S. Cl.
CPC ............ G06F 9/451 (2018.02); G06F 3/0483 (2013.01); G06F 3/0485 (2013.01)

(58) Field of Classification Search
CPC .... G06F 3/0483; G06F 3/0485; G06F 3/0486; G06F 9/451
See application file for complete search history.

(56) References Cited

U.S. PATENT DOCUMENTS 5,559,946 A * 9/1996 Porter ................... G06F 3/0481
715/777
9,779,457 B1 * 10/2017 Fisher .................... G06Q 40/06
(Continued)

FOREIGN PATENT DOCUMENTS

CN 104516884 A 4/2015
CN 105786294 A 7/2016
(Continued)

OTHER PUBLICATIONS

Miao, D. et al., "A Mashup Development and Run Platform Supporting Terminal Devices Integration," Computer Applications and Software, vol. 2012, No. 12, 2012, 2 pages. (Submitted as abstract).
(Continued)

*Primary Examiner* — Daniel Samwel
(74) *Attorney, Agent, or Firm* — Alleman Hall & Tuttle LLP

(57) ABSTRACT

The embodiments of the present disclosure provide an interface display method and apparatus, an electronic device, a storage medium, and a program product. The method includes: displaying at least one first interface identifier in a first area of a preset interface, wherein the first interface identifier is an interface identifier related to a first interface, and the first interface is for presenting a media content; in response to a sliding on the preset interface, displaying at least one second interface identifier in the first area, wherein the second interface identifier is an interface identifier related to a second interface, and the second interface is configured to implement a different function from the first interface.

20 Claims, 5 Drawing Sheets

(56) References Cited

U.S. PATENT DOCUMENTS

| | | | | |
|---|---|---|---|---|
| 2011/0041092 | A1* | 2/2011 | Zhang | G06F 9/451 |
| | | | | 715/777 |
| 2011/0138313 | A1* | 6/2011 | Decker | G06F 3/0481 |
| | | | | 715/777 |
| 2012/0089950 | A1* | 4/2012 | Tseng | G06F 3/04883 |
| | | | | 715/854 |
| 2013/0047125 | A1 | 2/2013 | Kangas et al. | |
| 2013/0071822 | A1* | 3/2013 | Humphreys | G16H 20/70 |
| | | | | 434/236 |
| 2014/0189574 | A1 | 7/2014 | Stallings et al. | |
| 2015/0324068 | A1* | 11/2015 | Bellare | G06F 3/04886 |
| | | | | 715/777 |
| 2015/0339002 | A1* | 11/2015 | Arnold | G06F 3/0481 |
| | | | | 715/854 |
| 2015/0363048 | A1* | 12/2015 | Brown | G06F 3/0485 |
| | | | | 715/777 |
| 2017/0344197 | A1* | 11/2017 | Kolli | G06F 3/04845 |
| 2018/0300028 | A1* | 10/2018 | Vora | G06Q 30/0277 |
| 2019/0220164 | A1* | 7/2019 | Shah | G06F 3/04842 |

FOREIGN PATENT DOCUMENTS

| | | |
|---|---|---|
| CN | 107066258 A | 8/2017 |
| CN | 110764671 A | 2/2020 |
| CN | 111580718 A | 8/2020 |
| CN | 112241498 A | 1/2021 |
| CN | 112346612 A | 2/2021 |
| CN | 112433654 A | 3/2021 |
| CN | 112732957 A | 4/2021 |
| CN | 112988006 A | 6/2021 |
| CN | 113760150 A | 12/2021 |
| CN | 113867579 A | 12/2021 |
| CN | 114491349 A | 5/2022 |
| CN | 103488398 A | 1/2024 |
| JP | 2021144684 A | 9/2021 |

OTHER PUBLICATIONS

China National Intellectual Property Administration, Office Action Issued in Application No. 202210137766.9, Jun. 7, 2023, 7 pages. (Submitted with Translation of Search Report).

ISA China National Intellectual Property Administration, International Search Report Issued in Application No. PCT/CN2023/075130, May 30, 2023, WIPO, 3 pages.

China National Intellectual Property Administration, Supplementary Search Report Issued in Application No. 202210137766.9, Aug. 24, 2023, 2 pages.

Japan Patent Office, Office Action Issued in Application No. 2024-548475, Feb. 12, 2025, 12 pages.

European Patent Office, Extended European Search Report for European Application No. 23755731.9, mailed May 26, 2025, Germany, 9 pages.

* cited by examiner

INTERFACE DISPLAY METHOD FOR DISPLAYING INTERFACE IDENTIFIERS IN AN INTERFACE

CROSS-REFERENCE TO RELATED APPLICATIONS

This application is a Continuation Application of International Patent Application No. PCT/CN2023/075130, filed Feb. 9, 2023, which claims the priority to the CN patent application No. 202210137766.9 filed in the China National Intellectual Property Administration on Feb. 15, 2022, the contents of which are hereby incorporated by reference in their entireties.

FIELD

Embodiments of the present disclosure generally relate to the field of computers, and more specifically, to an interface display method and apparatus, an electronic device, a storage medium, and a program product.

BACKGROUND

When displaying a set interface, interface tags of other interfaces can be displayed in the set interface, to allow users to switch interfaces.

SUMMARY

Embodiments of the present disclosure provide an interface display method and apparatus, an electronic device, a storage medium and a program product, to provide more available interface tag displaying methods.

In a first aspect, the present disclosure provides an interface display method, comprising:
  displaying at least one first interface identifier in a first area of a preset interface, wherein the first interface identifier is an interface identifier related to a first interface, and the first interface is for presenting a media content;
  in response to a sliding on the preset interface, displaying at least one second interface identifier in the first area, wherein the second interface identifier is an interface identifier related to a second interface, and the second interface has a different function from the first interface.

In a second aspect, the present disclosure provides an interface displaying apparatus, comprising:
  a first identifier display module configured to display at least one first interface identifier in a first area of a preset interface, wherein the first interface identifier is an interface identifier related to a first interface, and the first interface is for presenting a media content; and
  a second identifier display module configured to display at least one second interface identifier in the first area in response to a sliding on the preset interface, wherein the second interface identifier is an interface identifier related to a second interface, and the second interface has a different function from the first interface.

In a third aspect, the present disclosure provides an electronic device, comprising: at least one processor;
  a memory storing at least one computer program;
  wherein the at least one computer program, when executed by the at least one processor, causes the at least one processor to implement the interface display method.

In a fourth aspect, the present disclosure further provides a computer readable storage medium having computer programs stored thereon, wherein the computer programs, when executed by a processor, implement the interface display method.

In a fifth aspect, the present disclosure further provides a computer program product which, when executed by a computer, causes the computer to implement the interface display method.

DETAILED DESCRIPTION OF EMBODIMENTS

Reference now will be made to the drawings to describe in detail the embodiments of the present disclosure. Although the drawings illustrate some embodiments of the present disclosure, the present disclosure can be implemented in various forms, and those embodiments are provided for an understanding of the present disclosure. The drawings and embodiments of the present disclosure are provided exemplarily.

It would be appreciated that respective steps in the implementations of the method according to the present disclosure may be performed in different orders and/or performed in parallel. In addition, the method implementations may include additional steps and/or steps omitted. The scope of the present disclosure is not limited thereto.

As used herein, the term "includes" and its variants are to be read as open-ended terms that mean "includes, but is not limited to." The term "based on" is to be read as "based at least in part on." The term "an embodiment" is to be read as "at least one embodiment;" the term "another embodiment" is to be read as "at least one further embodiment;" the term "some embodiments" is to be read as "at least some embodiments." Related definitions of other terms will be provided in the description below.

It should be noted that, the terms "first," "second" and the like mentioned in the present disclosure are only used to distinguish different apparatuses, modules or units, rather than limit an order of functions performed by the apparatus, module or unit or limit interdependence.

It should be noted that, the terms "one" and "a plurality of" mentioned in the present disclosure are illustrative, not restrictive, and should be understood as "at least one" by those skilled in the art, unless explicitly specified otherwise in the context.

Names of messages or information interacted between a plurality of apparatuses in the embodiments of the present disclosure are illustrative rather than limit the scope of the message or information. The methods of displaying page tags in the related technologies are too simple to meet the users' needs.

Figure 1:
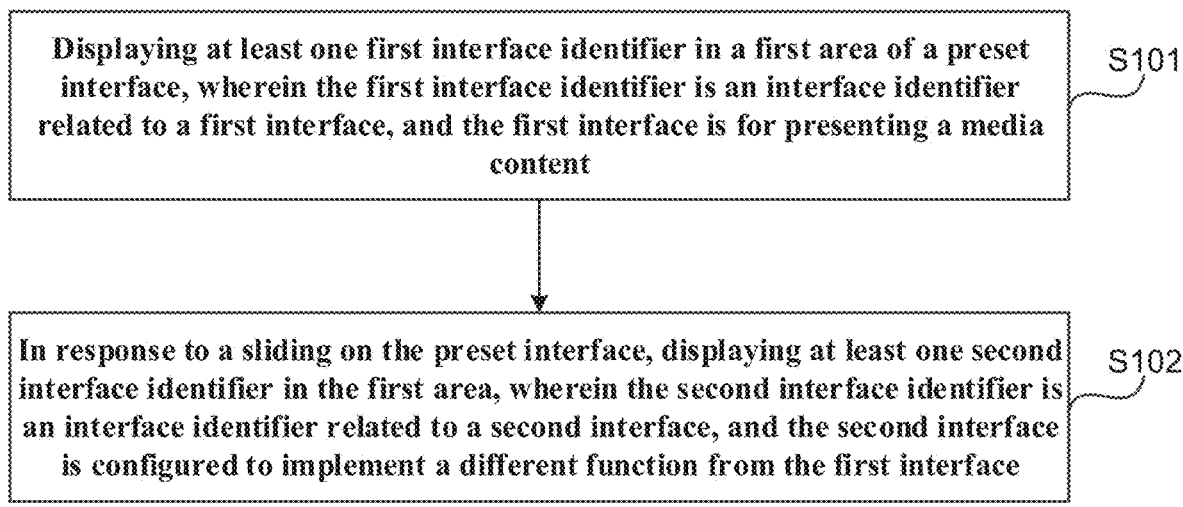
FIG. 1 illustrates a flowchart of an interface display method provided by an embodiment of the present disclosure.

FIG. 1 illustrates a flowchart of an interface display method provided by embodiments of the present disclosure. The method can be performed by an interface displaying apparatus, where the apparatus can be implemented by software and/or hardware and configured in an electronic device, for example, a cellphone or tablet. The interface display method provided by an embodiment of the present disclosure is applicable to a scenario of displaying interface identifiers in a preset interface. As shown therein, the interface display method provided by the embodiment may include:

S101: displaying at least one first interface identifier in a first area of a preset interface, wherein the first interface identifier is an interface identifier corresponding to a first interface, and the first interface is for presenting a media content.

The preset image may be an interface that displays an interface identifier corresponding to an inner interface for displaying a media content, and may include a first interface and/or a second interface. By way of example, the first interface may be an interface for presenting a media content (i.e., a media content presenting interface), where the media content includes images and/or words, etc. For example, the first interface may be an interface for presenting a content posted by a user on a platform in the form of video, article or the like, or an interface for presenting media content information of a commodity presented on a platform. Hereinafter, a video play interface will be taken as the example of the first interface. The first interface identifier may be an interface identifier corresponding to the first interface. An interface identifier of an interface (e.g. a first or a second interface, or the like) may be used to identify information of the interface, for example, an interface name thereof or the like.

Figure 2:
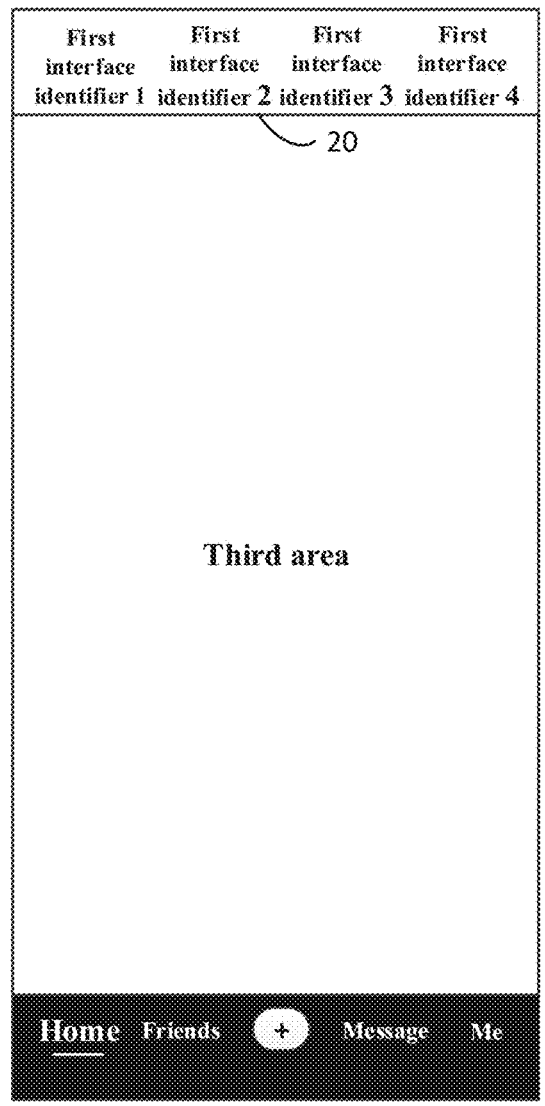
FIG. 2 illustrates a schematic diagram of displaying a first interface identifier provided by an embodiment of the present disclosure.

As shown in FIG. 2, when displaying a preset interface, the electronic device can display in a first area 20 of the preset interface at least one first interface identifier, for example, an interface identifier corresponding to the interface presenting a media content of at least one corresponding type (e.g., video, article or the like), or display an interface identifier corresponding to an interface presenting a media content of at least one type in preset types of media contents, for example, an interface identifier corresponding to at least one video play interface. The video play interface may include, for example, a recommended video play interface for playing a recommended video, a followed video play interface for playing a video posted by other user that the user follows, a teaching video play interface for playing a knowledge popularization video, a live video play interface for playing a live video, or the like. Hereinafter, the video play interface is taken as the example of the first interface for illustration.

In the embodiment, when initially displaying the preset interface (for example, when entering the homeinterface of the current application), only at least one first interface identifier can be displayed in the first area of the preset interface, without the second interface identifier, as shown in FIG. 2; or at least one first interface identifier and at least one second interface identifier can be simultaneously displayed in the first area of the preset interface, where displaying at least one first interface identifier in the first area of the preset interface includes: displaying at least one first interface identifier and at least one second interface identifier in the first area of the preset interface.

When initially displaying the preset interface, whether a second interface identifier is displayed in the first area of the preset interface can be set in advance by a developer or a user. Alternatively, it may be determined depending on a total number of first interface identifiers to be displayed. For example, the first interface identifiers are prioritized for displaying in the first area. If the total number of the first interface identifiers to be displayed is greater than or equal to a preset identifier display number of the first area, only the first interface identifiers are displayed in the first area; if the total number of the first interface identifiers to be displayed is less than the preset identifier display number of the first area, the first interface identifiers and the second interface identifiers are displayed simultaneously in the first area. This is not limited in the present embodiment. The preset identifier display number of the first area may be a maximum number of interface identifiers that can be displayed simultaneously in the first area, which can be set in advance by a user or a developer.

S102: in response to a sliding on the preset interface, displaying at least one second interface identifier in the first area, wherein the second interface identifier is an interface identifier corresponding to a second interface, and the second interface has a different function from the first interface.

The sliding on the preset interface may be an operation of switching the interface identifier displayed in the first area, which is triggered by sliding. In an embodiment, the sliding on the preset interface includes: a sliding on the first area or a sliding on a third area for presenting an image. The third area may be a primary display area of the preset interface. When the preset interface is a video play interface, the third area may be an area for presenting an image in the preset interface. The first area is located within or outside the third area. The sliding direction of the sliding can be set flexibly as required. For example, the sliding direction of the sliding may be set to horizontal or vertical slide, or the like.

The second interface may be an interface having a different function than that of the first interface in a preset dimension, where the preset dimension may be a usage dimension in content display, and different function types may include different usages in content display, for example, providing users with consumable media content information, or providing users with configurable function options or operable preset function interfaces. By way of example, when the first interface is a media content display interface, the second interface may be an interface for implementing other functions than the media content display function provided in the application, for example, a configuration interface for providing users with a configuration function, a search interface for providing users with a search function, a scan interface for providing users with a QR code scanning function, and the like.

Figure 3:
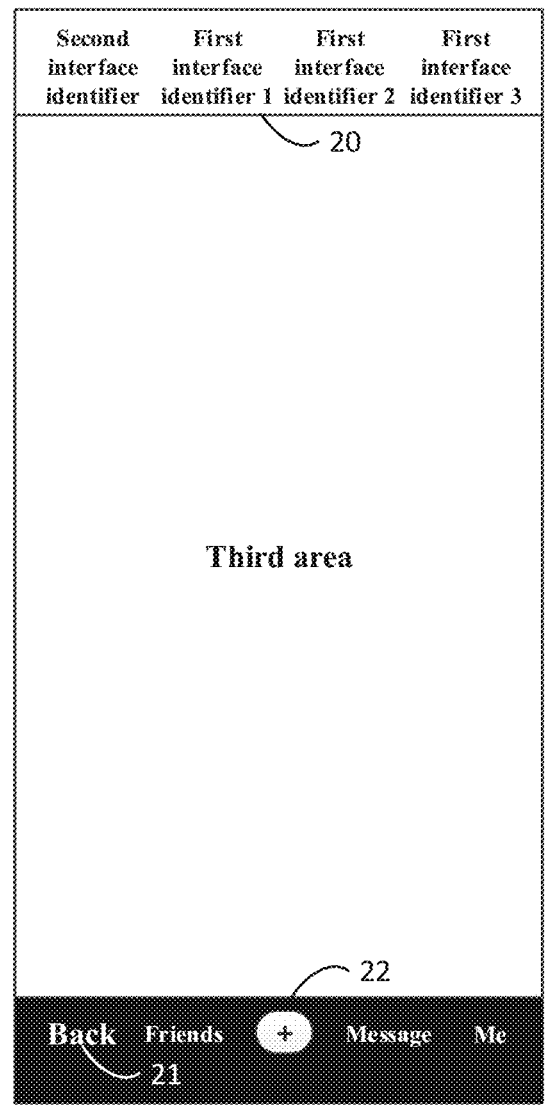
FIG. 3 illustrates a schematic diagram of displaying a second interface identifier provided by an embodiment of the present disclosure.

When expecting to instruct the electronic device to display at least one second interface identifier in the first area 20, a user may perform a sliding on the preset interface. Therefore, upon receiving the sliding of the user, the electronic device can display at least one second interface identifier (as shown in FIG. 3) in the first area 20 (e.g. updating in batches the interface identifiers displayed in the first area 20) in response to the sliding, so as to display the at least one second interface identifier in the first area 20, or can control the second interface identifier located outside of the first area 20 (i.e., the second interface identifier not displayed in the first area) to move into the first area 20 for displaying.

In the embodiment, the number of times the slidings is executed is not displayed. For example, the user can instruct the electronic device to display the at least one second interface identifier in the first area by performing the switch slide operation only once, or by performing the slidings multiple times.

In this embodiment, in the display area (i.e., the first area) of the interface identifier are displayed interface identifiers corresponding to interfaces having different functions in the preset dimension, for example, an interface identifier corresponding to an interface having a media content display function, and an interface identifier corresponding to an interface having a function other than the media content display function, rather than just interface identifiers corresponding to interfaces with the same function in the preset dimension. If only interface identifiers corresponding to different interfaces with the media content display function are displayed, users can review and use different functions of the current application through a simple sliding. Accordingly, the embodiment can make the interface-identifier presenting manner diversified, simplify the operations required for users to use different functions of the current application.

In this embodiment, when the second interface identifier is displayed in the first area in response to the sliding on the preset interface, a display of the interface identifier (e.g. the first interface identifier) originally displayed in the first area can be directly switched to a display of the second interface identifier to be displayed; or, the at least one interface identifier originally displayed in the first area can be controlled to move in the same direction, to move the at least one interface identifier originally displayed in the first area out of the first area while moving the at least one second interface identifier to be displayed into the first area for displaying. At this time, displaying at least one second interface identifier in the first area may include: controlling the second interface identifier, together with the first interface identifier displayed in the first area, to move in the same direction, to move the second interface identifier into the first area for displaying. The movement direction of the first interface identifier can be set flexibly as required. For example, when the sliding is a horizontal slide operation and the at least one interface identifier in the first area is arranged horizontally, the at least one interface identifier displayed in the first area can be controlled to move along the sliding direction of the slide operation.

In an implementation, the interface display method provided by the embodiment may further include: in response to the switch operation for the preset interface, displaying an interface to be displayed, where the interface to be displayed is an interface corresponding to the switch operation.

In the above implementation, the switch operation for the preset interface may be a trigger operation of instructing the electronic device to switch the preset interface being displayed currently to a first or a second interface, for example, a sliding or a click switch operation effected in the preset interface. In an embodiment, the switch operation for the preset interface includes: a sliding on the preset interface or a click switch operation for any interface identifier, where the interface identifier includes the first interface identifier. Wherein, the click switch operation may be an operation of switching the interface identifier displayed in the first area in a click-triggering manner, for example, a click operation effected on any first interface identifier displayed in the first area. When the second interface identifier is displayed in the first area, the click switch operation may also be a click operation effected on any second interface identifier displayed in the first area.

Upon receiving the switch operation effected in the preset interface, an interface to be displayed corresponding to the switch operation can be determined, the current interface is switched from the preset interface to the interface to be displayed, and the at least one second interface identifier can be displayed in the first area. When the interface to be displayed corresponding to the sliding is determined (for example, the switch operation is a sliding), the interface to be displayed can be determined based on the switch direction of the sliding and the arrangement order of the at least one interface identifier in the first area; when the switch operation is a click switch operation effected in the first area, the interface corresponding to the interface identifier upon which the click operation is effected is determined as the interface to be displayed.

The interface display method provided by this embodiment includes: displaying at least one first interface identifier in a first area of a preset interface, where the first interface identifier is an interface identifier corresponding to a first interface, and the first interface is for presenting a media content; in response to a sliding on the preset interface, displaying at least one second interface identifier in the first area, where the second interface identifier is an interface identifier corresponding to a second interface, and the second interface has a different function from the first interface. With the above technical solution, this embodiment can enable interface identifiers corresponding to interfaces with different functions in a preset dimension to be displayed in a display area of interface identifiers. Therefore, the embodiment can make the interface-identifier presenting manner diversified, simplify the operations required for users to use different functions.

Figure 4:
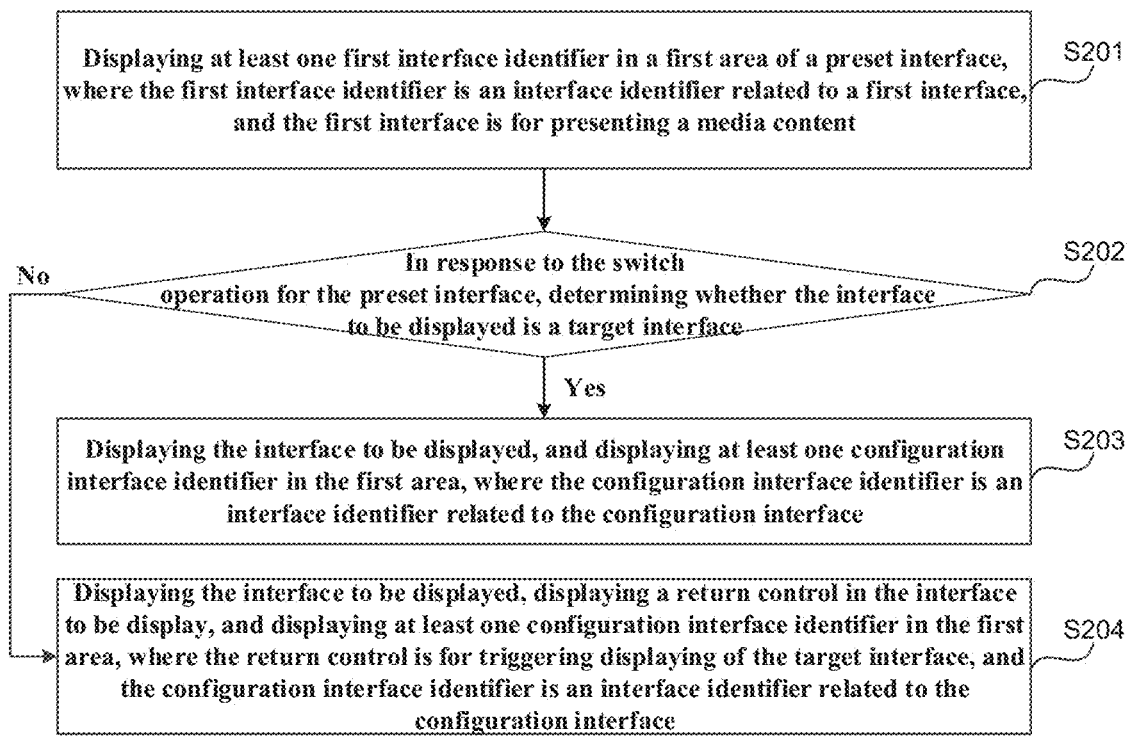
FIG. 4 illustrates a flowchart of a further interface display method provided by an embodiment of the present disclosure.

FIG. 4 is a flowchart of a further interface display method provided by an embodiment of the present disclosure. The solution in the present embodiment can be combined with one or more solutions in the above embodiments. The second interface includes a configuration interface, and displaying the at least one second interface identifier in the first area includes: displaying at least one configuration interface identifier in the first area.

Displaying the interface to be displayed includes: in the event that the interface to be displayed is a target interface, displaying the interface to be displayed; in the event that the interface to be displayed is not the target interface, displaying the interface to be displayed, and displaying a return control in the interface to be displayed, wherein the return control is for triggering displaying of the target interface.

Correspondingly, as shown in FIG. 4, the interface display method provided by this embodiment includes:

S201: displaying at least one first interface identifier in a first area of a preset interface, where the first interface identifier is an interface identifier corresponding to a first interface, and the first interface is for presenting a media content.

S202: in response to the switch operation for the preset interface, determining whether the interface to be displayed is a target interface; if the interface to be displayed is the target interface, performing S203; if the interface to be displayed in not the target interface, performing S204, where the interface to be displayed is an interface corresponding to the switch operation.

The target interface may be a set interface in the first interface and the second interface, i.e., the target interface may be the first interface, or may be the second interface. Hereinafter, a first interface is taken as the example of the target interface for illustration.

Upon receiving the switch operation for the preset interface, the electronic device can determine the interface to be displayed corresponding to the switch operation, and determine, based on whether the interface to be displayed is the target interface, whether a return control is displayed in the interface to be displayed.

S203: displaying the interface to be displayed, and displaying at least one configuration interface identifier in the first area, where the configuration interface identifier is an interface identifier corresponding to the configuration interface.

The configuration interface may be an interface that configures the current application, for example, a configuration interface of the current application. In an embodiment, the configuration interface includes a configuration interface of the first interface identifier, to enable a user to configure the first interface identifier displayed in the first area.

The second interface is taken as the example of the configuration interface. When the interface to be displayed is the target interface, the interface to be displayed can be displayed, and the configuration interface identifier of the at least one configuration interface can be displayed in the first area, to enable a user to perform the corresponding configuration operation.

S204: displaying the interface to be displayed, displaying a return control in the interface to be displayed, and displaying at least one configuration interface identifier in the first area, where the return control is for triggering displaying of the target interface, and the configuration interface identifier is an interface identifier corresponding to the configuration interface.

Figure 5:
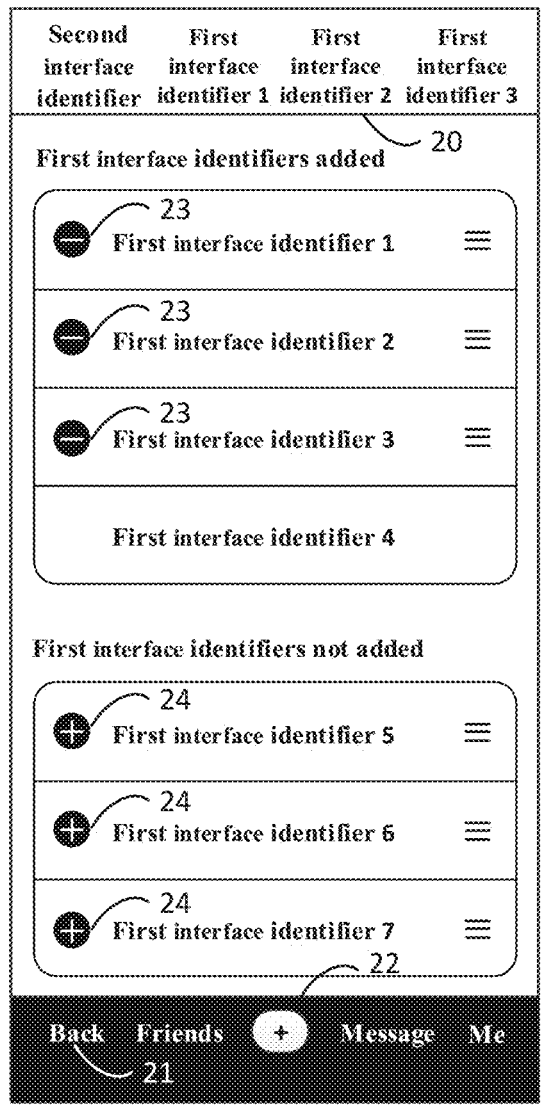
FIG. 5 is a schematic diagram of a configuration interface provided by an embodiment of the present disclosure.

Here, the second interface is taken as the example of the configuration interface. When the interface to be displayed is not the target interface, the interface to be displayed can be displayed, a configuration interface identifier of at least one configuration interface can be displayed in the first area, and a return control 21 can be displayed in the interface to be displayed, as shown in FIGS. 3 and 5 (in FIG. 5, the interface corresponding to the first interface identifier 4 is taken as the example of the target interface). Therefore, the user can quickly return to the target interface by triggering the return control 21, omitting the sliding or the operation of clicking on the interface identifier corresponding to the target interface to switch the current interface to the target interface, which can provide convenience for the user to enter the target interface.

In the present embodiment, the display manner of the return control can be set flexibly as required. For example, the return control 21 can be additionally displayed in the first area or the third area in the interface to be displayed. Alternatively, an existing control in the interface to be displayed can be switched to and displayed as the return control 21. For example, a preset control displayed in the second area 22 of the interface to be displayed is switched to and displayed as the return control 21, as shown in FIGS. 3 and 5 (in the figures, the preset control is the example of the home interface control), to prevent the display of the return control 21 from forming extra occlusion for the content displayed in the interface to be displayed. At this time, displaying the return control 21 in the interface to be displayed may include: displaying the return control 21 in the first area 20 of the interface to be displayed; or switching and displaying the preset control displayed in the second area 22 of the interface to be displayed to and as the return control 21. Wherein, the second area 22 may be a control display area of the interface to be displayed, which may be located outside of the first area 20 and the third area of the interface to be displayed, for example, located in an area at the bottom of the interface to be displayed.

In an implementation, in response to the sliding on the preset interface, the present interface is switched from the first interface to the configuration interface; the method further includes: in response to the configuration operation effected in the configuration interface, updating the first interface identifier displayed in the first area.

In the above implementation, when the current interface to be displayed is the configuration interface, the user can configure the first interface identifier displayed in the first area in the configuration interface.

As shown in FIG. 5, the first interface identifier added in the first area 20 (i.e., the first interface identifier that can be displayed in the first area 20) and the first interface identifier having not been added in the first area 20 (i.e., the first interface identifier that cannot be displayed in the first area 20 yet) can be displayed in the primary display area (i.e., the third area) of the configuration interface such that the user can: delete the first interface identifier from the first area 20 by triggering an add cancel control 23 corresponding to an added first interface identifier; add the first interface identifier to the first area 20 by triggering an add control 24 corresponding to a first interface identifier having not been added; and change an arrangement order of at least one added interface identifier in the configuration interface through a dragging operation, to thus update the display order of the at least one first interface identifier in the first area 20.

In addition, continuing with FIG. 5 (in FIG. 5, the interface corresponding to the first interface identifier 4 is taken as the example of the target interface), the interface identifier corresponding to the target interface can be displayed in the configuration interface as non-deletable from the first area. For example, the add cancel control corresponding to the interface identifier corresponding to the target interface may not be displayed in the configuration interface, to prevent the user from deleting the interface identifier corresponding to the target interface from the first area by triggering the add cancel control.

The interface display method provided by this embodiment includes: displaying the configuration interface identifier in the first area, and displaying a return control of the target interface in the interface to be displayed in the event that the interface to be displayed is not the target interface, to configure the current application for users, in particular the first interface identifier displayed in the first area. As such, this embodiment can provide convenience, simplify the operations required for users to enter the target interface.

Figure 6:
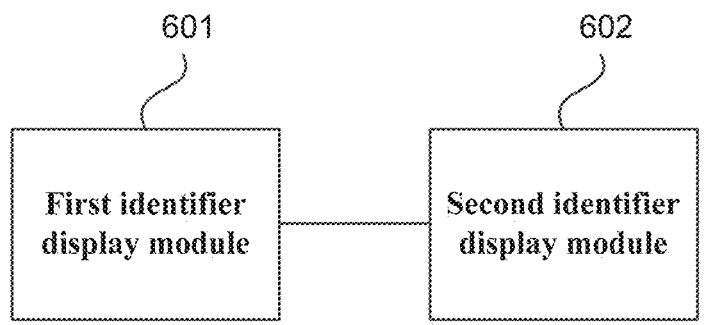
FIG. 6 is a structural block diagram of an interface displaying apparatus provided by an embodiment of the present disclosure.

FIG. 6 is a structural block diagram of an interface displaying apparatus provided by an embodiment of the present disclosure. The apparatus can be implemented by software and/or hardware, and can be configured in an electronic device, for example, a cellphone or a tablet, which can display interface identifiers corresponding to interfaces with different functions by performing the interface display method. As shown therein, the interface displaying apparatus provided by the embodiment may include: a first identifier display module 601 and a second identifier display module 602.

The first identifier display module 601 is configured to display at least one first interface identifier in a first area of a preset interface, where the first interface identifier is an interface identifier corresponding to a first interface, and the first interface is for presenting a media content; and the second identifier display module 602 is configured to display at least one second interface identifier in the first area in response to a sliding on the preset interface, where the second interface identifier is an interface identifier corresponding to a second interface, and the second interface has a different function from the first interface.

The interface displaying apparatus provided by the embodiment can display, by the first identifier display module, at least one first interface identifier in a first area of a preset interface, where the first interface identifier is an interface identifier corresponding to a first interface, and the first interface is for presenting a media content, and display, by the second identifier display module, at least one second interface identifier in the first area in response to a sliding on the preset interface, where the second interface identifier is an interface identifier corresponding to a second interface, and the second interface has a different function from the first interface. With the above technical solution, this embodiment can enable interface identifiers corresponding to interfaces with different functions in a preset dimension to be displayed in a display area of interface identifiers. Therefore, the embodiment can make the interface-identifier presenting manner diversified, simplify the operations required for users to use different functions.

In the above solution, the second interface comprises a configuration interface, and the second identifier display module 602 may be configured to display at least one configuration interface identifier in the first area.

In the above solution, the configuration interface includes a configuration interface of the first interface identifier.

In the above solution, in response to the sliding on the preset interface, the preset interface is switched from the first interface to the configuration interface, and the interface displaying apparatus provided by this embodiment may further include: an identifier update module configured to update the first interface identifier displayed in the first area in response to a configuration operation performed in the configuration interface.

In the above solution, the second identifier display module 602 may be further configured to: display an interface to be displayed in response to a switch operation for the preset interface, where the interface to be displayed is an interface corresponding to the switch operation.

In the above solution, the second identifier display module 602 may be further configured to: in the event that the interface to be displayed is a target interface, display the interface to be displayed; in the event that the interface to be displayed is not the target interface, display the interface to be displayed, and displaying a return control in the interface to be displayed, where the return control is for triggering displaying of the target interface.

In the above solution, the second identifier display module 602 may be further configured to: display the return control in a first area of the interface to be displayed; or switch a display of a preset control displayed in a second area of the interface to be a display of the return control.

In the above solution, the switch operation for the preset interface may include: a sliding on the preset interface or a click switch operation for an interface identifier, where the interface identifier includes the first interface identifier.

In the above solution, the sliding on the preset interface may include: a sliding on the first area or a sliding on a third area for presenting an image.

In the above solution, the second identifier display module 602 may be further configured to: control the second interface identifier and the first interface identifier displayed in the first area to move in a same direction to move the second interface into the first area for displaying.

In the above solution, the first identifier display module 601 may be further configured to: display the at least one first interface identifier and the at least one second interface identifier in the first area of the preset interface.

The interface displaying apparatus can perform the interface display method provided by any of the embodiments of the present disclosure, which has corresponding functional modules for performing the interface display method and can achieve corresponding effects. For the technical details not exhausted here, see the description about the interface display method provided by any of the embodiments of the present disclosure.

Figure 7:
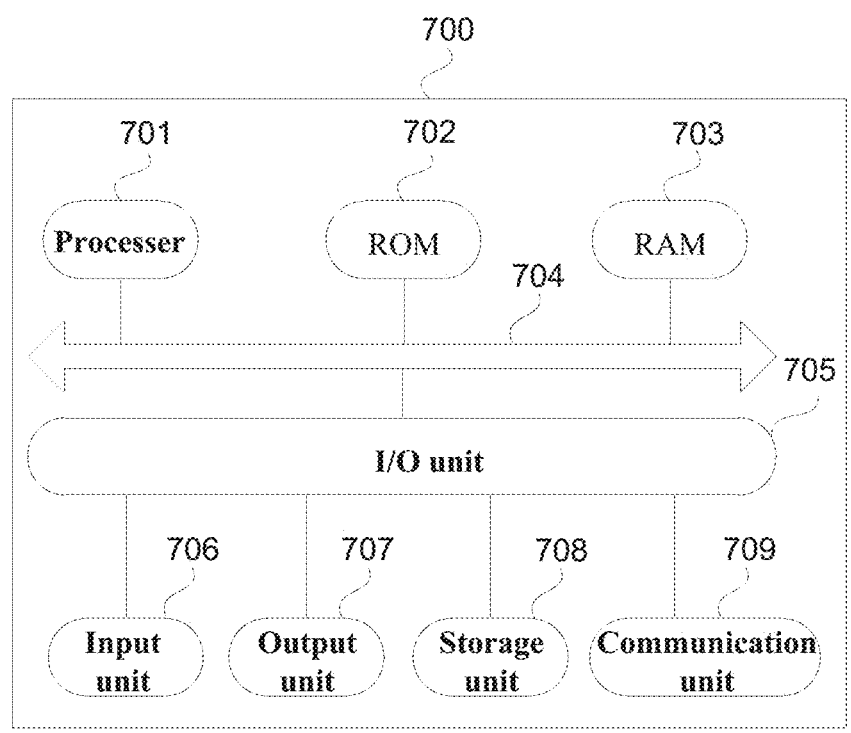
FIG. 7 is a structural schematic diagram of an electronic device provided by an embodiment of the present disclosure.

Reference below will be made to FIG. 7 which illustrates a structural schematic diagram of an electronic device 700 adapted to implement embodiments of the present disclosure. The electronic device according to the embodiments of the present disclosure may include, but is not limited to, a mobile terminal such as a mobile phone, a laptop computer, a digital broadcast receiver, a Personal Digital Assistant (PDA), a Portable Android Device (PAD), a Portable Media Player (PMP), an on-vehicle terminal (e.g. an on-vehicle navigation terminal) or the like, or a fixed terminal such as a digital TV, a desktop computer or the like. The electronic device as shown in FIG. 7 is provided merely as an example, without suggesting any limitation to the functions and the application range of the embodiments of the present disclosure.

As shown therein, the electronic device 700 may include a processor (e.g. a central processor, a graphics processor or the like) 701, which can execute various acts and processing based on programs stored in a Read Only Memory (ROM) 702 or a program loaded from a storage unit 708 to a Random Access Memory (RAM) 703. RAM 703 stores therein various programs and data required for operations of the electronic device 700. The processor 701, the ROM 702 and the RAM 703 are connected to one another via a bus 704. An input/output (I/O) interface 705 is also connected to the bus 704.

Typically, the following units may be connected to the I/O interface 705: an input unit 706 including, for example, a touchscreen, a touch pad, a keyboard, a mouse, a camera, a microphone, an accelerometer, a gyroscope and the like; an output unit 707 including, for example, a Liquid Crystal Display (LCD), a loudspeaker, a vibrator and the like; a storage unit 708 including, for example, a tape, a hard drive and the like; and a communication unit 709. The communication unit 709 can allow wireless or wired communication of the electronic device 700 with other devices to exchange data. Although FIG. 7 shows the electronic device 700 including various units, it would be appreciated that not all of the units as shown are required to be implemented or provided. Alternatively, more or fewer units may be implemented or provided.

According to embodiments of the present disclosure, the processes described above with reference to the flowcharts may be implemented as computer software programs. For example, embodiments of the present disclosure include a computer program product comprising a computer program carried on a computer readable medium, the computer program containing program code for performing the methods as in the flowcharts. In those embodiments, the computer program may be downloaded and installed from a network via the communication unit 709, or may be installed from the storage unit 708, or may be installed from the ROM

702. The computer program, when executed by the processor 701, performs the above-described functions defined in the method according to the embodiments of the present disclosure.

It should be noted that the computer readable medium according to the present disclosure may be a computer readable signal medium or a computer readable storage medium or any combination of the two. The computer readable storage medium may be, for example, but not limited to, an electronic, magnetic, optical, electromagnetic, infrared, or semiconductor system, apparatus, or device, or any combination of the foregoing. More specific examples of the computer readable storage medium may include, but are not limited to: an electrical connection having one or more wires, a portable computer diskette, a hard disk, an RAM, an ROM, an erasable programmable read-only memory (EPROM or flash memory), an optical fiber, a portable compact disc read-only memory (CD-ROM), an optical storage device, a magnetic storage device, or any suitable combination of the foregoing. In the present disclosure, a computer readable storage medium may be any tangible medium that can contain, or store, a program for use by or in connection with an instruction execution system, apparatus, or device. In contrast, in the present disclosure, a computer readable signal medium may include a propagated data signal with computer readable program code embodied therein, either in baseband or as part of a carrier wave. Such propagated data signal may take many forms, including, but not limited to, an electro-magnetic signal, an optical signal, or any suitable combination thereof. A computer readable signal medium may also be any computer readable medium that is not a computer readable storage medium and that can communicate, propagate, or transmit a program for use by or in connection with an instruction execution system, apparatus, or device. Program code embodied on a computer readable medium may be transmitted using any appropriate medium, including but not limited to: electrical wires, optical cables, RF (radio frequency), etc., or any suitable combination of the foregoing.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (e.g. ad hoc peer-to-peer network), and any known network or network to be developed.

The computer-readable medium may be the one included in the electronic device, or may be provided separately, rather than assembled in the electronic device.

The computer-readable medium carries one or more programs which, when executed by the electronic device, cause the electronic device to: display at least one first interface identifier in a first area of a preset interface, where the first interface identifier is an interface identifier corresponding to a first interface, and the first interface is for presenting a media content; in response to a sliding on the preset interface, display at least one second interface identifier in the first area, where the second interface identifier is an interface identifier corresponding to a second interface, and the second interface has a different function from the first interface.

Computer program codes for performing operations of the present disclosure may be written by using one or more program design language or any combination. The program design language includes, but is not limited to, object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowchart and block diagrams in the drawings illustrate the functionality and operation of possible implementations of methods, apparatus and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems which perform the specified functions or acts, or combinations of special purpose hardware and computer instructions.

The units described in the embodiments of the present disclosure may be implemented by software or hardware. Wherein, the designation of a module or unit does not in some cases constitute a limitation to the unit itself.

The functions described above may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chip (SOCs), Complex Programmable Logic Devices (CPLDs), and the like.

In the context of this disclosure, a machine-readable medium may be a tangible medium that can contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of a computer-readable storage medium would include an electrical connection based on one or more wires, a portable computer diskette, a hard disk, an RAM, an ROM, an EPROM or flash memory, an optical fiber, a CD-ROM, an optical storage device, a magnetic storage device, or any suitable combination of the foregoing.

According to one or more embodiments of the present disclosure, Example 1 provides an interface display method, comprising:

displaying at least one first interface identifier in a first area of a preset interface, where the first interface identifier is an interface identifier corresponding to a first interface, and the first interface is for presenting a media content;

in response to a sliding on the preset interface, displaying at least one second interface identifier in the first area, where the second interface identifier is an interface identifier corresponding to a second interface, and the second interface has a different function from the first interface.

According to one or more embodiments of the present disclosure, Example 2 further defines the method of Example 1, where the second interface comprises a configuration interface, and displaying the at least one second interface identifier in the first area comprises:

displaying at least one configuration interface identifier in the first area.

According to one or more embodiments of the present disclosure, Example 3 further defines the method of Example 2, where the configuration interface comprises a configuration interface of the first interface identifier.

According to one or more embodiments of the present disclosure, Example 4 further defines the method of Example 3, where, in response to the sliding on the preset interface, the preset interface is switched from the first interface to the configuration interface, and the method further comprises:

in response to a configuration operation performed in the configuration interface, updating the first interface identifier displayed in the first area.

According to one or more embodiments of the present disclosure, Example 5 further defines the method of Example 1, further comprising:

in response to a switch operation for the preset interface, displaying an interface to be displayed, wherein the interface to be displayed is an interface corresponding to the switch operation.

According to one or more embodiments of the present disclosure, Example 6 further defines the method of Example 5, where displaying the interface to be displayed comprises:

in the event that the interface to be displayed is a target interface, displaying the interface to be displayed;

in the event that the interface to be displayed is not the target interface, displaying the interface to be displayed, and displaying a return control in the interface to be displayed, wherein the return control is for triggering displaying of the target interface.

According to one or more embodiments of the present disclosure, Example 7 further defines the method of Example 6, where displaying the return control in the interface to be displayed comprises:

displaying the return control in a first area of the interface to be displayed; or switching a display of a preset control displayed in a second area of the interface to be a display of the return control.

According to one or more embodiments of the present disclosure, Example 8 further defines the method of any of Examples 5-7, where the switch operation for the preset interface comprises: a sliding on the preset interface or a click switch operation for an interface identifier, where the interface identifier comprises the first interface identifier.

According to one or more embodiments of the present disclosure, Example 9 further defines the method of Example 8, where the sliding on the preset interface comprises: a sliding on the first area or a sliding on a third area for presenting an image.

According to one or more embodiments of the present disclosure, Example 10 further defines the method of any of Examples 1-7, where displaying the at least one second interface identifier in the first area comprises:

controlling the second interface identifier and the first interface identifier displayed in the first area to move in a same direction to move the second interface into the first area for displaying.

According to one or more embodiments of the present disclosure, Example 11 further defines the method of any of Examples 1-7, where displaying the at least one interface identifier in the first area of the preset interface comprises:

displaying the at least one first interface identifier and the at least one second interface identifier in the first area of the preset interface.

According to one or more embodiments of the present disclosure, Example 12 provides an interface displaying apparatus, comprising:

a first identifier display module configured to display at least one first interface identifier in a first area of a preset interface, where the first interface identifier is an interface identifier corresponding to a first interface, and the first interface is for presenting a media content;

a second identifier display module configured to display at least one second interface identifier in the first area in response to a sliding on the preset interface, where the second interface identifier is an interface identifier corresponding to a second interface, and the second interface has a different function from the first interface.

According to one or more embodiments of the present disclosure, Example 13 provides an electronic device, comprising:

at least one processor;

a memory storing at least one computer program;

wherein the at least one computer program, when executed by the at least one processor, causes the at least one processor to implement the interface display method of any of Examples 1-11.

According to one or more embodiments of the present disclosure, Example 14 provides a computer readable storage medium having computer programs stored thereon, wherein the computer programs, when executed by a processor, implement the interface display method of any of Examples 1-11.

According to one or more embodiments of the present disclosure, Example 15 provides a computer program product which, when executed by a computer, causes the computer to implement the interface display method of any of Examples 1-11.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular implementations. Certain features that are described in the context of separate embodiments may also be implemented in combination in a single embodiment. Conversely, various features that are described in the context of a single implementation may also be implemented in multiple embodiments separately or in any suitable sub-combination.

We claim:

1. An interface display method, comprising:
   displaying at least one first interface identifier in a first area of a preset interface, wherein the first interface identifier is an interface identifier related to a first interface, and the first interface is for presenting a media content; and
   in response to a sliding for the preset interface, displaying at least one second interface identifier in the first area, wherein the second interface identifier is an interface identifier related to a second interface, and the second interface is configured to implement a different function from the first interface, the second interface comprises a configuration interface, the configuration interface is configured for configuring the first interface identifier displayed in the first area of the preset interface, a third area of the configuration interface displays the first interface identifier which has been added in the first area and a first interface identifier which has not been added in the first area.

2. The method of claim 1, wherein displaying the at least one second interface identifier in the first area comprises:
   displaying at least one configuration interface identifier in the first area.

3. The method of claim 1, wherein configuring the first interface identifier displayed in the first area of the preset interface comprises at least one of the following:
   removing the first interface identifier which has been added from the first area;
   adding the first interface identifier which has not been added to the first area; or
   changing a display order for displaying, in the first area, the first interface identifier which has been added.

4. The method of claim 3, wherein, in response to the sliding on the preset interface, the preset interface is switched from the first interface to the configuration interface, and the method further comprises:
   in response to a configuration operation performed in the configuration interface, updating the first interface identifier displayed in the first area.

5. The method of claim 1, further comprising:
   in response to a switch operation for the preset interface, displaying an interface to be displayed, wherein the interface to be displayed is an interface related to the switch operation.

6. The method of claim 5, wherein displaying the interface to be displayed comprises:
   in the event that the interface to be displayed is a target interface, displaying the interface to be displayed; and
   in the event that the interface to be displayed is not the target interface, displaying the interface to be displayed, and displaying a return control in the interface to be displayed, wherein the return control is for triggering displaying of the target interface.

7. The method of claim 6, wherein displaying the return control in the interface to be displayed comprises:
   displaying the return control in a first area of the interface to be displayed; or
   switching a display of a preset control displayed in a second area of the interface to be a display of the return control.

8. The method of claim 5, wherein the switch operation for the preset interface comprises: a sliding on the preset interface or a click switch operation for an interface identifier, wherein the interface identifier comprises the first interface identifier.

9. The method of claim 8, wherein the sliding on the preset interface comprises: a sliding on the first area or a sliding on the third area for presenting an image.

10. The method of claim 1, wherein displaying the at least one second interface identifier in the first area comprises:
    controlling the second interface identifier and the first interface identifier displayed in the first area to move in a same direction to move the second interface into the first area for displaying.

11. The method of claim 1, wherein displaying the at least one interface identifier in the first area of the preset interface comprises:
    displaying the at least one first interface identifier and the at least one second interface identifier in the first area of the preset interface.

12. An electronic device, comprising:
    at least one processor; and
    a memory storing at least one computer program;
    wherein the at least one computer program, when executed by the at least one processor, causes the at least one processor to implement actions comprising:
    displaying at least one first interface identifier in a first area of a preset interface, wherein the first interface identifier is an interface identifier corresponding to a first interface, and the first interface is for presenting a media content; and
    in response to a slide switch operation for the preset interface, displaying at least one second interface identifier in the first area, wherein the second interface identifier is an interface identifier corresponding to a second interface, and the second interface is configured to implement a different function from the first interface, the second interface comprises a configuration interface, the configuration interface is configured for configuring the first interface identifier displayed in the first area of the preset interface, a third area of the configuration interface displays the first interface identifier which has been added in the first area and a first interface identifier which has not been added in the first area.

13. The electronic device of claim 12, wherein displaying the at least one second interface identifier in the first area comprises:
    displaying at least one configuration interface identifier in the first area.

14. The electronic device of claim 12, wherein configuring the first interface identifier displayed in the first area of the preset interface comprises at least one of the following:
    removing the first interface identifier which has been added from the first area;
    adding the first interface identifier which has not been added to the first area; or
    changing a display order for displaying, in the first area, the first interface identifier which has been added.

15. The electronic device of claim 14, wherein, in response to the slide switch operation for the preset interface, the preset interface is switched from the first interface to the configuration interface, and the actions further comprises:
    in response to a configuration operation performed in the configuration interface, updating the first interface identifier displayed in the first area.

16. The electronic device of claim 12, wherein the actions further comprise:

in response to a switch operation for the preset interface, displaying an interface to be displayed, wherein the interface to be displayed is an interface corresponding to the switch operation.

17. A computer program product being stored in a non-transitory computer storage medium and comprising computer-executable instructions which, when executed by a computer, causes the computer to implement the interface display method comprising:

displaying at least one first interface identifier in a first area of a preset interface, wherein the first interface identifier is an interface identifier related to a first interface, and the first interface is for presenting a media content; and in response to a slide switch operation for the preset interface, displaying at least one second interface identifier in the first area, wherein the second interface identifier is an interface identifier related to a second interface, and the second interface is configured to implement a different function from the first interface, the second interface comprises a configuration interface, the configuration interface is configured for configuring the first interface identifier displayed in the first area of the preset interface, a third area of the configuration interface displays the first interface identifier which has been added in the first area and a first interface identifier which has not been added in the first area.

18. The computer program product of claim 17, wherein displaying the at least one second interface identifier in the first area comprises:

displaying at least one configuration interface identifier in the first area.

19. The computer program product of claim 17, wherein configuring the first interface identifier displayed in the first area of the preset interface comprises at least one of the following:

removing the first interface identifier which has been added from the first area;

adding the first interface identifier which has not been added to the first area; or changing a display order for displaying, in the first area, the first interface identifier which has been added.

20. The computer program product of claim 19, wherein, in response to the slide switch operation for the preset interface, the preset interface is switched from the first interface to the configuration interface, and the method further comprises:

in response to a configuration operation performed in the configuration interface, updating the first interface identifier displayed in the first area.

\* \* \* \* \*